US007825770B2

(12) United States Patent
Postelwait et al.

(10) Patent No.: US 7,825,770 B2
(45) Date of Patent: Nov. 2, 2010

(54) SYSTEM AND METHOD OF IDENTIFICATION, INSPECTION AND TRAINING FOR MATERIAL LIFTING PRODUCTS

(75) Inventors: Larry Postelwait, Catoosa, OK (US); Michael W. Wheeler, Catoosa, OK (US); Michael H. Osborn, Broken Arrow, OK (US)

(73) Assignee: The Crosby Group LLC, Tulsa, OK (US)

( * ) Notice: Subject to any disclaimer, the term of this patent is extended or adjusted under 35 U.S.C. 154(b) by 1144 days.

(21) Appl. No.: 11/423,062

(22) Filed: Jun. 8, 2006

(65) Prior Publication Data

US 2010/0117787 A1 May 13, 2010

(51) Int. Cl.

| | |
|---|---|
| ***G05B 19/00*** | (2006.01) |
| ***G05B 19/02*** | (2006.01) |
| ***H04Q 5/22*** | (2006.01) |
| ***G08B 13/14*** | (2006.01) |
| ***G01M 17/00*** | (2006.01) |
| ***G06F 17/40*** | (2006.01) |

(52) U.S. Cl. ................ 340/5.92; 340/10.1; 340/825.23; 340/572.1; 340/572.4; 701/33; 702/187

(58) Field of Classification Search ....................... None
See application file for complete search history.

(56) References Cited

U.S. PATENT DOCUMENTS

| | | | | |
|---|---|---|---|---|
| 3,713,129 | A | 1/1973 | Buchholz | |
| 5,202,680 | A | 4/1993 | Savage | |
| 5,498,202 | A | 3/1996 | Vande Berg | |
| 5,964,656 | A | 10/1999 | Lawler, Jr. et al. | |
| 6,140,930 | A | 10/2000 | Shaw | |
| 6,144,301 | A | 11/2000 | Frieden | |
| 6,206,282 | B1 | 3/2001 | Hayes, Sr. et al. | |
| 6,231,435 | B1 | 5/2001 | Pilger | |
| 6,282,863 | B1 * | 9/2001 | Christian et al. | 52/747.1 |
| 6,452,497 | B1 | 9/2002 | Finlayson | |
| 6,486,781 | B2 | 11/2002 | Edwards et al. | |
| 6,501,382 | B1 | 12/2002 | Rehfus et al. | |
| 6,549,139 | B2 | 4/2003 | Shaw, Jr. | |
| 6,744,372 | B1 | 6/2004 | Shaw et al. | |
| 6,837,427 | B2 | 1/2005 | Overhultz et al. | |
| 6,959,235 | B1 * | 10/2005 | Abdel-Malek et al. | 701/33 |
| 6,970,088 | B2 | 11/2005 | Kovach | |
| 7,047,159 | B2 * | 5/2006 | Muehl et al. | 702/184 |

(Continued)

FOREIGN PATENT DOCUMENTS

EP 1864939 A1 * 12/2007

(Continued)

*Primary Examiner*—Daniel Wu
*Assistant Examiner*—Fekadeselassie Girma
(74) *Attorney, Agent, or Firm*—Head, Johnson & Kachigian, P.C.

(57) ABSTRACT

A method and system of identifying, inspecting and training regarding a material lifting device. The method includes the steps of attaching RFID tag to a material lifting device. Identification and inspection data regarding the material lifting device is installed and stored on the RFID tag. The identification and inspection data on the RFID tag may be accessed with a portable computer device having an RFID reader. The material lifting device is periodically inspected to obtain inspection data. The identification and inspection data is updated on the portable computer device and is also updated on the RFID tag.

6 Claims, 8 Drawing Sheets

U.S. PATENT DOCUMENTS

| | | | | |
|---|---|---|---|---|
| 7,340,373 | B2 * | 3/2008 | Shimomura | 702/173 |
| 7,427,916 | B2 * | 9/2008 | Matsumoto et al. | 340/521 |
| 2001/0047283 | A1 * | 11/2001 | Melick et al. | 705/8 |
| 2002/0186134 | A1 | 12/2002 | Rehfus et al. | |
| 2003/0155415 | A1 | 8/2003 | Markham et al. | |
| 2003/0158795 | A1 | 8/2003 | Markham et al. | |
| 2004/0032328 | A1 * | 2/2004 | Rubinstein | 340/568.1 |
| 2004/0095380 | A1 | 5/2004 | Bass et al. | |
| 2004/0164140 | A1 | 8/2004 | Voeller et al. | |
| 2004/0206810 | A1 | 10/2004 | Yamagiwa | |
| 2005/0242169 | A1 | 11/2005 | Michal, III | |
| 2005/0256608 | A1 | 11/2005 | King et al. | |
| 2005/0280536 | A1 * | 12/2005 | Hamilton et al. | 340/572.1 |
| 2006/0049949 | A1 * | 3/2006 | Jurs et al. | 340/572.8 |
| 2006/0055552 | A1 | 3/2006 | Chung et al. | |
| 2006/0058913 | A1 | 3/2006 | Andersen et al. | |
| 2006/0170551 | A1 * | 8/2006 | Nakamura et al. | 340/572.1 |

FOREIGN PATENT DOCUMENTS

| | | |
|---|---|---|
| WO | WO2007006753 | 1/2007 |

* cited by examiner

SYSTEM AND METHOD OF IDENTIFICATION, INSPECTION AND TRAINING FOR MATERIAL LIFTING PRODUCTS

BACKGROUND OF THE INVENTION

1. Field of the Invention

The present invention is directed to automatically identify, to facilitate regular periodic inspection, and to provide training and information to personnel on usage of material lifting products. In particular, the present invention is directed to a method and system for identification, inspection and training for material lifting products, such as chain slings, wire rope slings, synthetic slings, blocks, hoist rings, hooks and other associated components.

2. Prior Art

Industrial lifting products or devices take a variety of forms. For instance, lifting products include chain slings and associated components, wire rope slings, synthetic web slings, block, hoist rings, clamps and hooks. Existing lifting products are identified in a number of ways, such as nameplates, name tags and other physical indicia. These may contain identifying information, such as the manufacturer, the serial number, the working load limit, the date of manufacture and the country of origin. The identifying information may be included at the request of the manufacturer or, because of industry or government regulations.

In industrial applications, periodic inspections are performed at the work site to confirm that the equipment is in proper working order. These periodic inspections are done for safety reasons and, increasingly, because of government or industry mandated requirements. These inspections require visual inspection of the lifting product for defects and record keeping of the periodic inspection data. For example, in the case of synthetic web slings, a tear in the synthetic web would be an example of a defect which must be addressed.

Inspections and record keeping may take place under governmental regulation or industry standards such as the American Society of Mechanical Engineers.

Industry standards include ASME B30.9 for all types of slings and ASME B30.26 for rigging hardware including shackles, hooks, blocks and clamps. For example, Section 9-5.8 of ASME B30.9 directed to synthetic web slings requires an initial inspection before using any new, repaired or modified sling. Additionally, periodic inspection is required to meet all of the requirements of the standard. Additionally, Section 9-5.8.2 requires that written inspection records be kept for all slings including a description of the new sling and its condition on each periodic inspection.

Considerable time and effort is involved in performing the periodic inspections and storing the information on the inspections. In many cases, the inspections are performed in the field under adverse conditions. For example, the lifting equipment may be located on or near marine vessels and structures or remote areas in factory plants. The inspection and report writing process is often labor intensive and redundant.

It would be desirable to provide an automated system to provide for the identity, inspection and training regarding material lifting products.

Another factor present in the existing inspection system is that there are often multiple parties involved including the manufacturer, the distributor, the end user and third-party inspection companies, each of which may have their own inspection reporting systems.

It would be desirable to provide a system and method for identification, inspection and training for material lifting products which is uniform.

There have been various uses proposed for radio frequency identification (RFID) tags in the past. Radio frequency identification systems rely on storing and remotely retrieving data using devices called RFID tags or transponders, which contain silicon chips and antennas to enable them to receive and respond to radio frequency queries from an RFID transceiver or reader. RFID tags can be either passive, semi-passive, or active. Passive RFID tags have no internal power supply. Minute electrical current induced in the antenna by an incoming radio frequency signal provides just enough power for an integrated circuit in the tag to power up and transmit a response. Semi-passive RFID tags are similar to passive tags except for the addition of a small battery. Active RFID tags have their own internal power source which is used to power any integrated circuits that generate the outgoing signal.

In each instance, the tag contains a transponder with a digital memory chip. The interrogator, an antenna packaged with a transceiver and decoder emits a signal activating the RFID tag so that it can read and write data to it. The reader decodes the data encoded on the tag's integrated circuit. Application software then processes the data.

For instance, Rehfus et al. (U.S. Pat. No. 6,501,382 and U.S. Publication No. 2002/0186134) discloses a transponder, such as a radio frequency identification (RFID) tag embedded or secured into a pocket or chamber of a bearing which contains identification information.

Frieden (U.S. Pat. No. 6,144,301) discloses RFID tags which may be periodically read by a reader unit and the information displayed or transferred electronically including safety and warning label information.

Yamagiwa (U.S. Patent Publication No. 2004/0206810) discloses a management system for transportation equipment including RFIDs in vehicles which communicate with computers such as servers 10, terminals 20, portable terminals 21 and PDAs.

Nevertheless, none of the foregoing disclose the use of RFID tags and transponders in lifting products which include a multitude of data including identity information, inspection information which may be periodically updated and stored, and training information on use of material lifting products.

SUMMARY OF THE INVENTION

The present invention is directed to a system and to a method for identifying, inspecting and training regarding material lifting products.

The present invention may be used with various material lifting products, including blocks, wire rope slings, wire rope sling assemblies, chain sling assemblies, master link assemblies, plate clamps and hooks and other associated components.

When a material lifting device is manufactured, an RFID tag or chip would be attached to or incorporated along with the material lifting product. A particular alphanumeric identification designation will be assigned to each tag or chip and accordingly to each lifting product. The RFID tag will include information of the type of the product, the date the product was put into service, the last inspection date and the status of the product at the last inspection date.

In one preferred procedure, an RFID reader/writer operates in conjunction with a portable computer such as a personal digital assistant, including a central processing unit, an input interface, such as a keyboard, a display or monitor, and communication means. The user will initially be provided with a choice in the form of a template to select from various lifting products. The RFID reader will read the serial number which will be searched against the database held in the memory of the personal digital assistant computer device. If a match of the serial number is found within the database, an inspection screen or template will be presented on the monitor or display. Various information which has been stored will be displayed including the name of the distributor, the serial number of the lifting product and particular information about the product including the grade, construction type and other pertinent information. Any defects would be noted on the inspection template. The information entered will be stored on the personal digital assistant computer device.

Additionally, once the inspection is complete, all of the changes entered onto the template will be sent and updated to the RFID tag attached to the material lifting device.

the information stored on the PDA portable computer device may also be transferred and stored to a personal computer or other computer system or computer network.

DETAILED DESCRIPTION OF THE PREFERRED EMBODIMENTS

Figure 1:
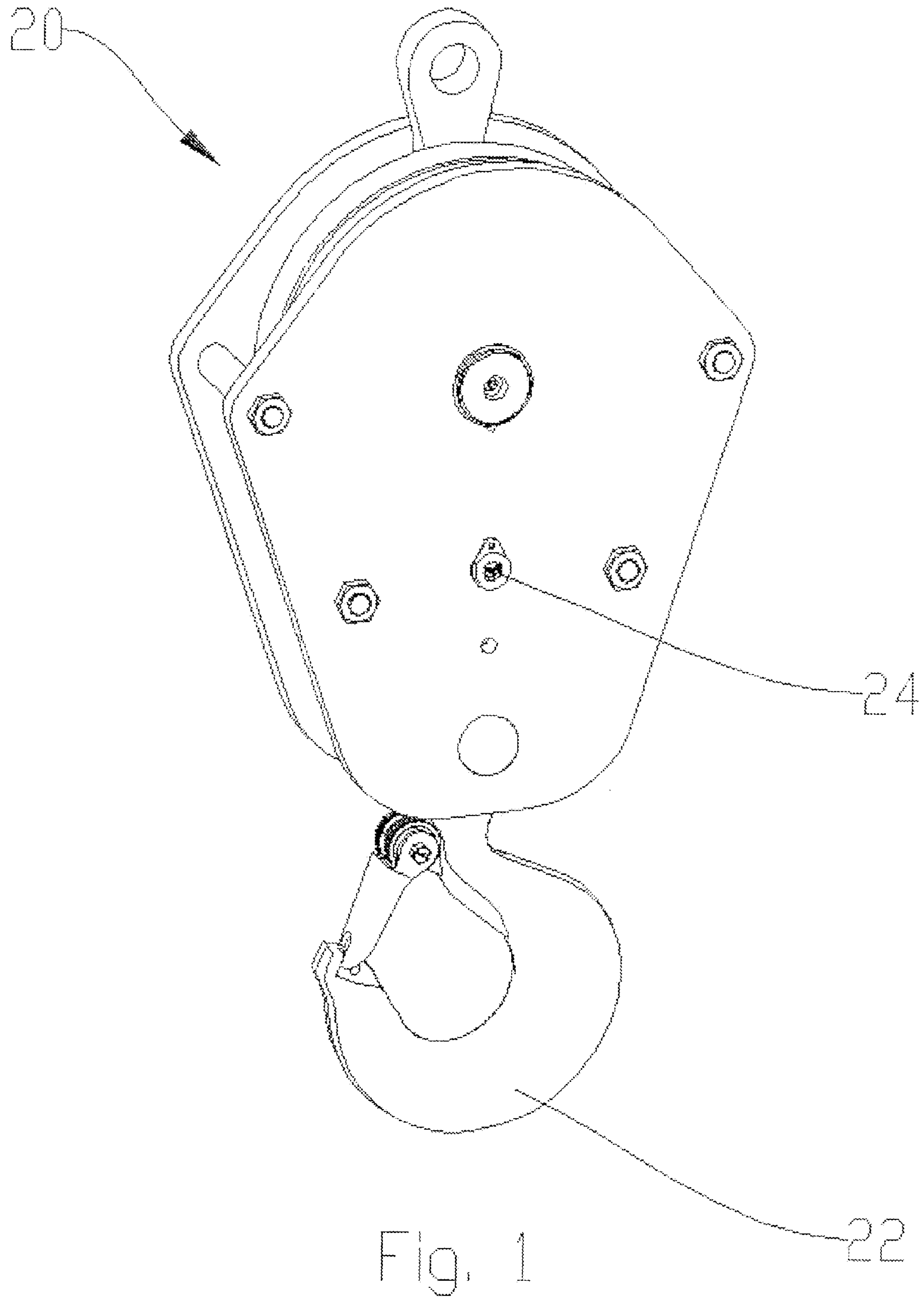
FIG. 1 illustrates a perspective view of an industrial lifting block incorporating the system and method of identification, inspection and training for material lifting products.

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Referring to the drawings in detail, FIGS. 1 through 6 illustrate various applications of the present invention on various types of material lifting products. The present invention provides a method and a system to identify material products, provide a mechanism for inspection of the material lifting products, provide a mechanism for recording keeping of inspections records, and provide training for use of material lifting products. The present invention provides a uniform system of inspection and record keeping for the life of the product.

Figure 2:
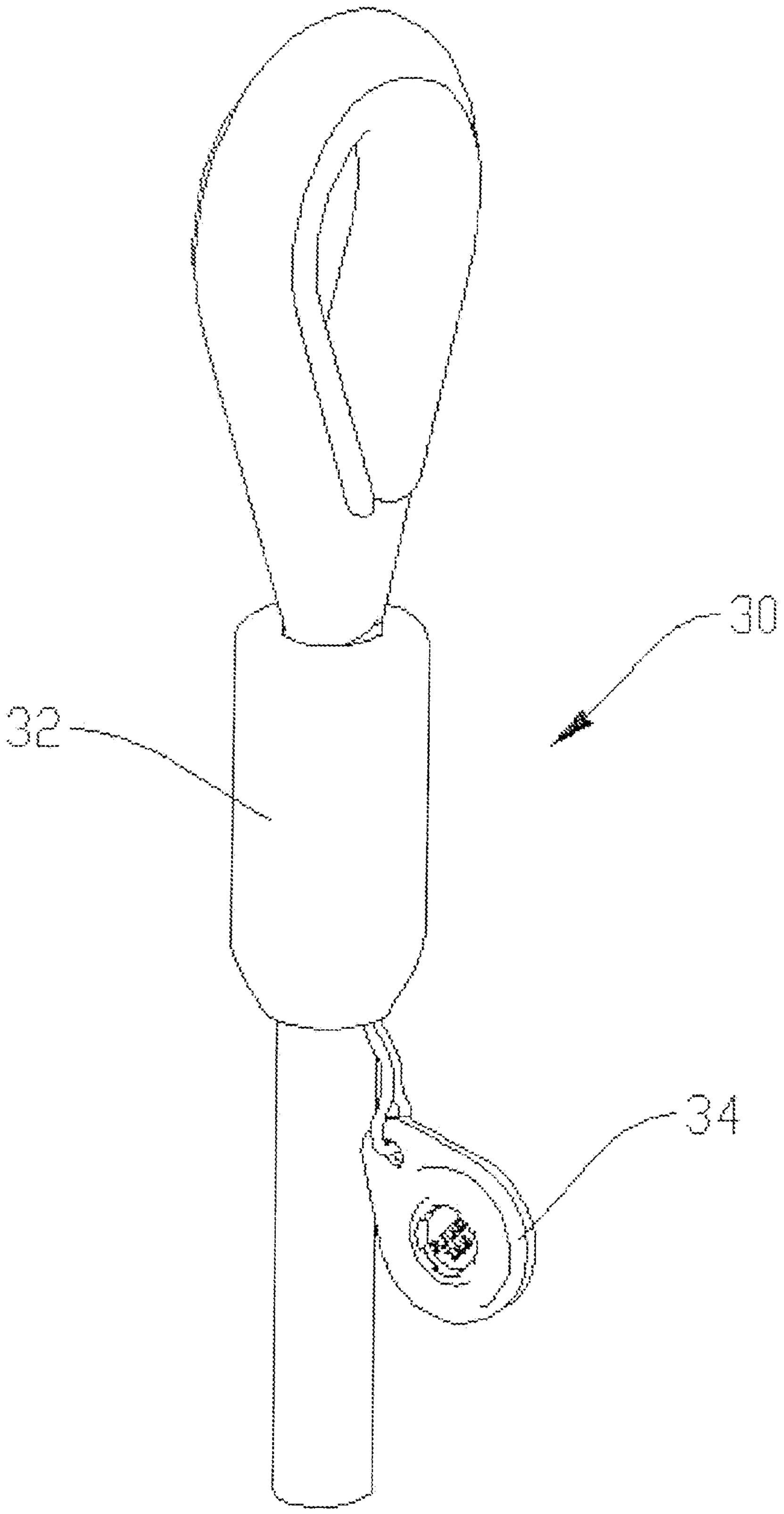
FIG. 2 illustrates a perspective view of a wire rope sling incorporating the teachings of the present invention.

FIG. 1 illustrates a perspective view of an industrial lifting block 20 terminating in a hook 22. The block 20 includes a protected RFID tag 24 which is embedded and affixed to the block 20. FIG. 2 illustrates a perspective view of a wire rope sling 30 with a swage termination 32 having a protected RFID tag 34 attached thereto.

Figure 3:
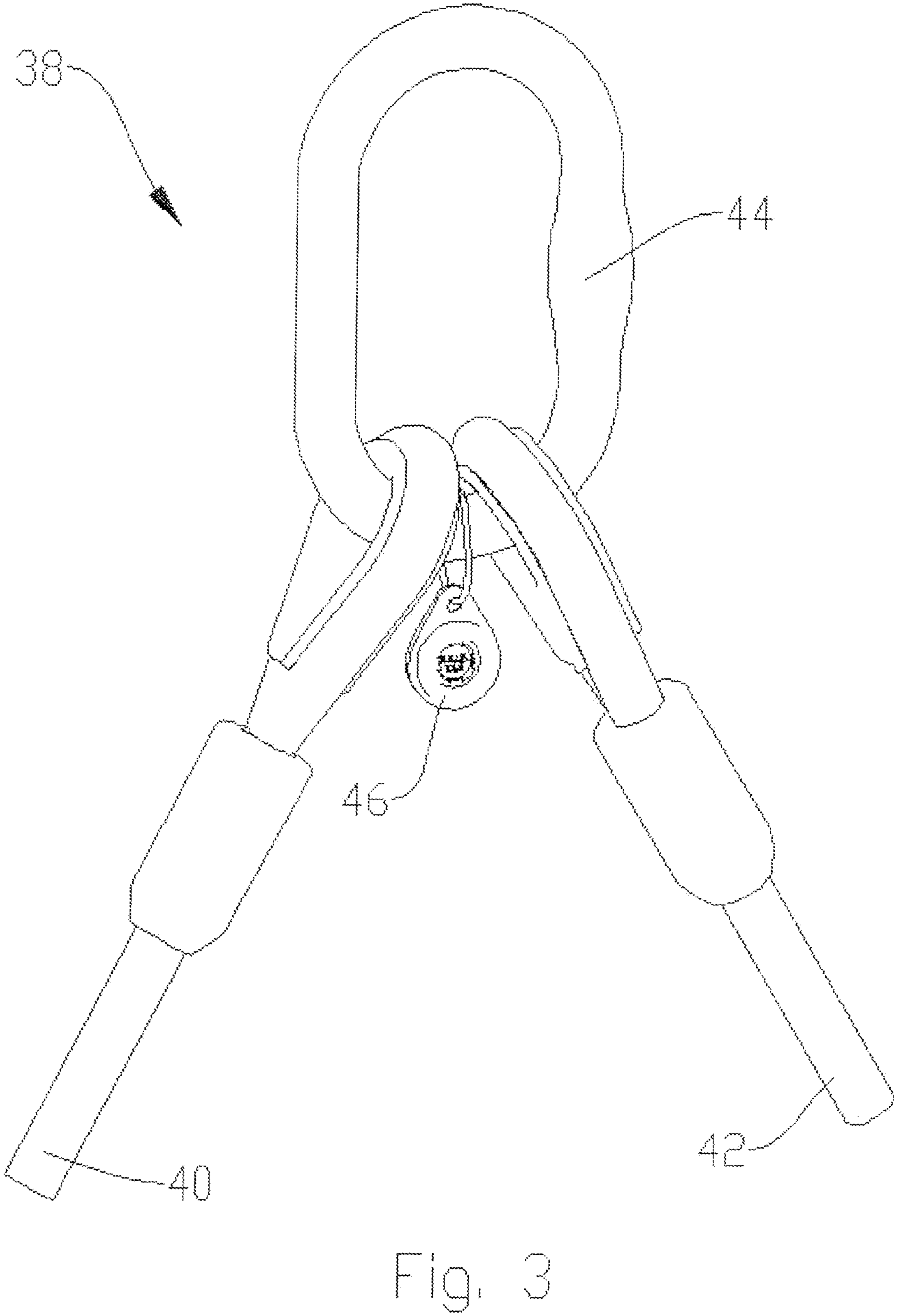
FIG. 3 illustrates a perspective view of a wire rope sling assembly incorporating the teachings of the present invention.

FIG. 3 illustrates a perspective view of a wire rope sling assembly 38 including a pair of wire rope sling 40 and 42 and a master link 44 having a protected RFID tag 46 attached thereto.

Figure 4:
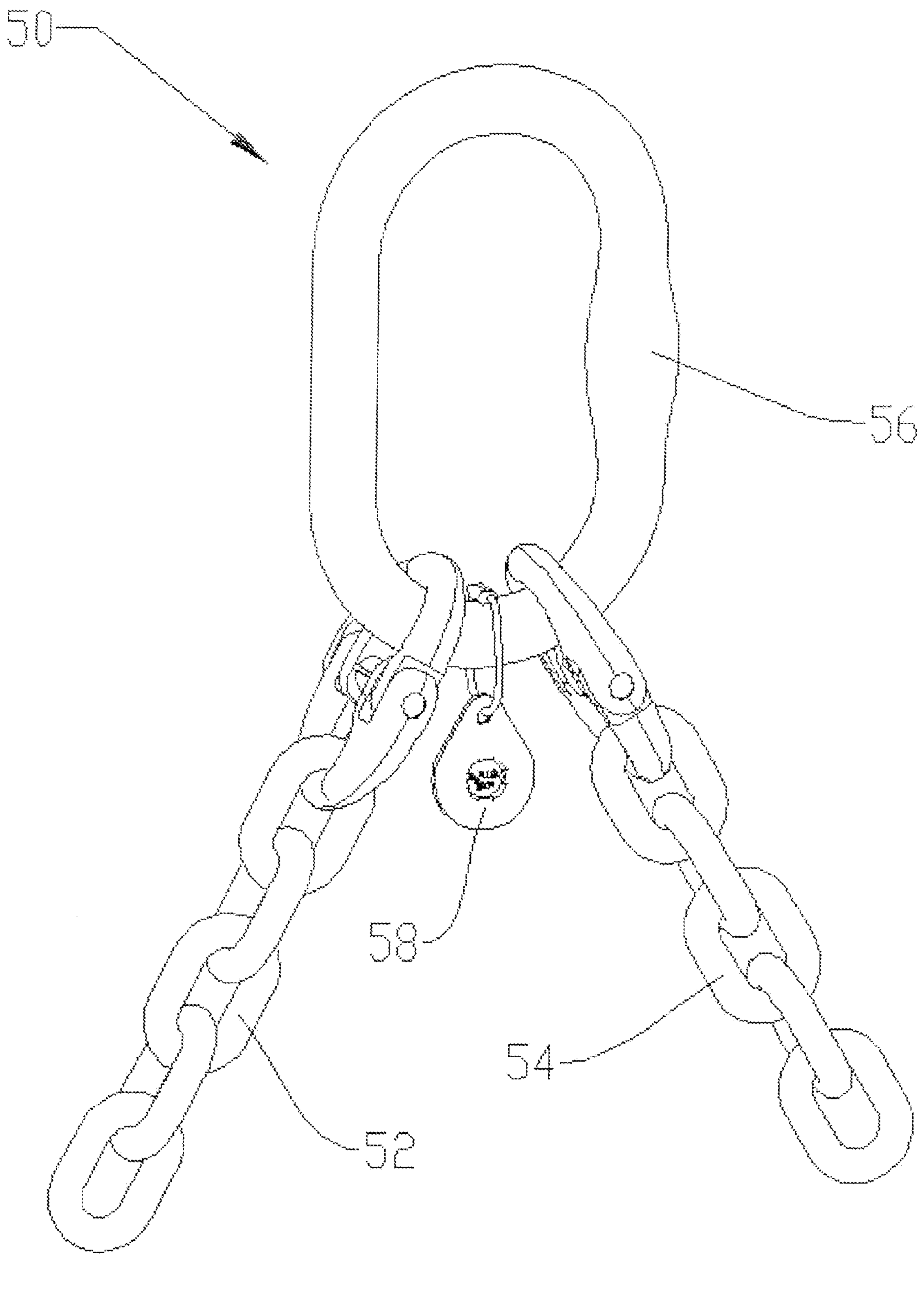
FIG. 4 illustrates a perspective view of a chain sling assembly incorporating the teachings of the present invention.

FIG. 4 illustrates a perspective view of a chain sling assembly 50 including a pair of chains 52 and 54 and a master link 56 having a protected RFID tag 58 attached thereto.

Figure 5:
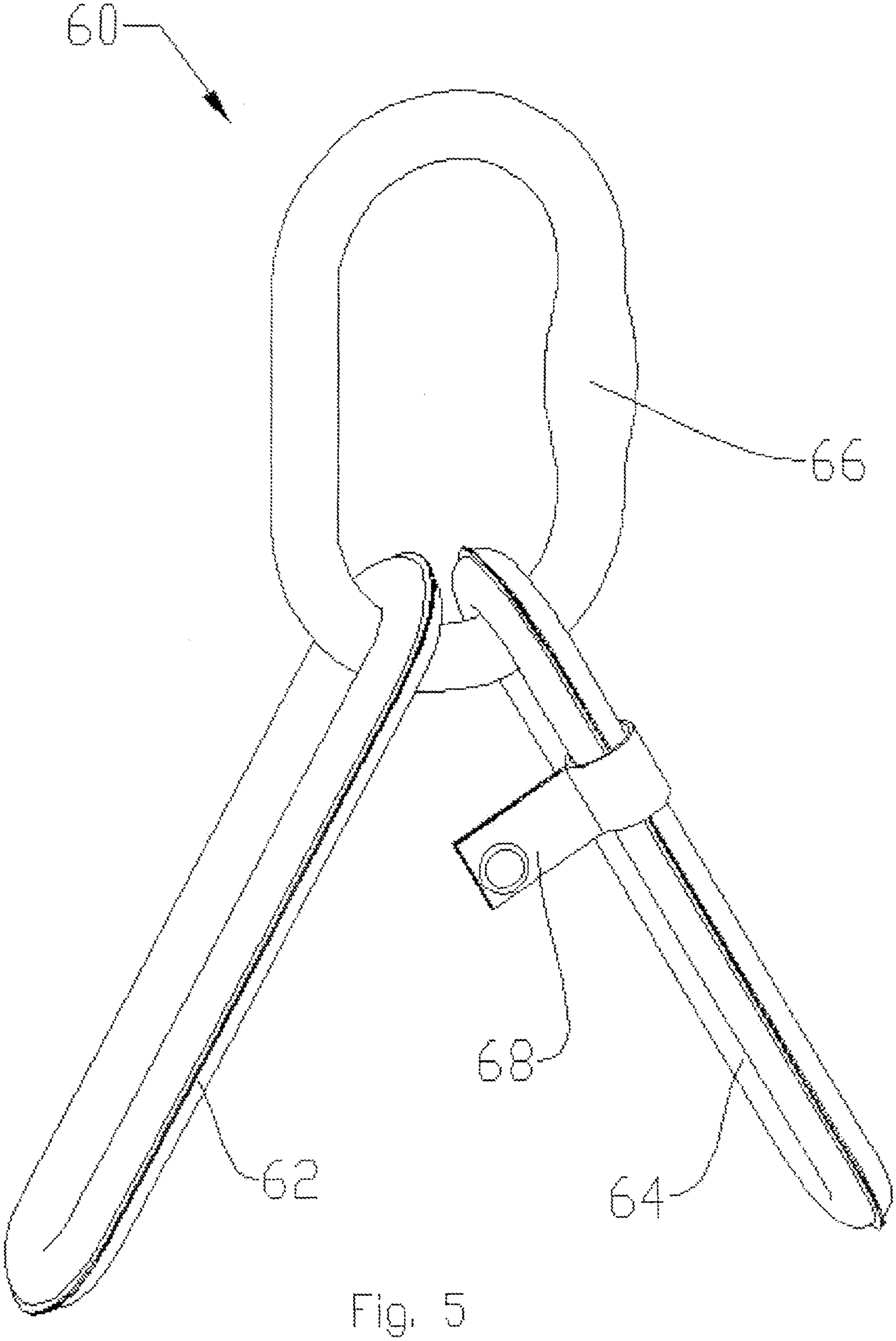
FIG. 5 illustrates a perspective view of a master link assembly incorporating the teachings of the present invention.

FIG. 5 illustrates a master link assembly 60 having a pair of links 62 and 64 suspended from a master link 66 with an RFID tag 68 attached thereto.

Figure 6:
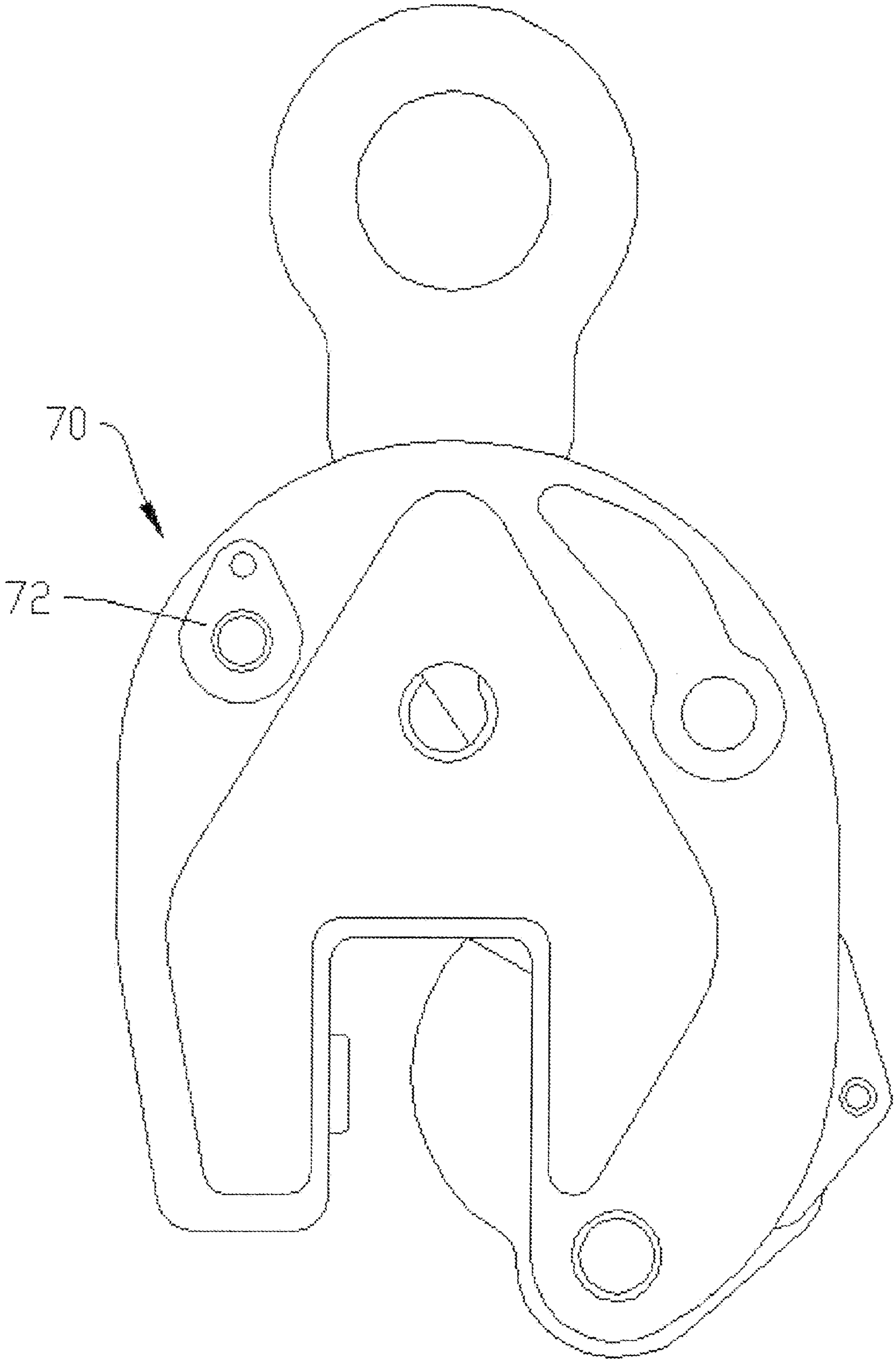
FIG. 6 illustrates a perspective view of a plate clamp incorporating the teachings of the present invention.

FIG. 6 illustrates a plate clamp 70 with an RFID tag 72 embedded thereon.

Figure 7:
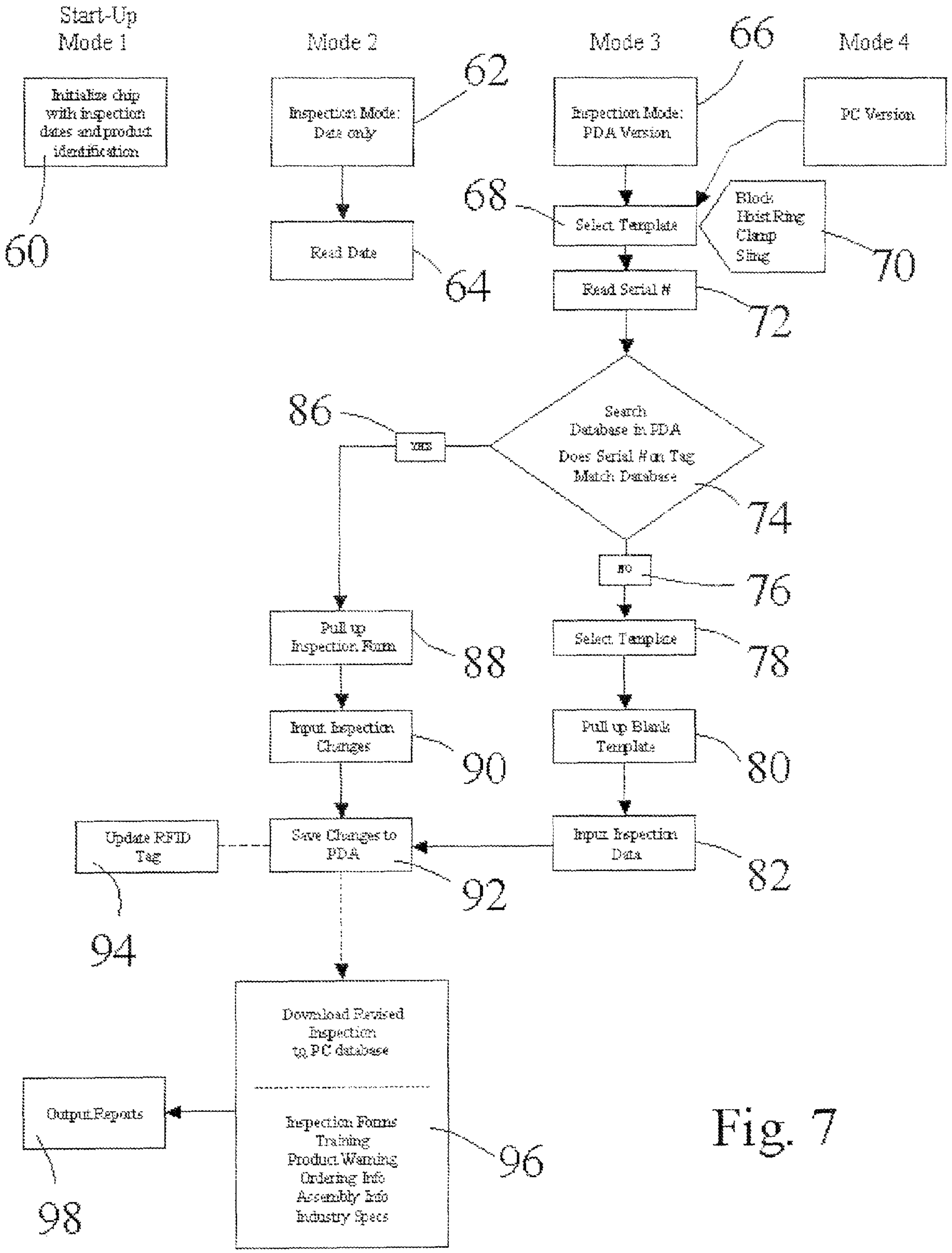
FIG. 7 illustrates a simplified diagrammatic flowchart of a process incorporating the present invention.

FIG. 7 illustrates a simplified diagrammatic flowchart of a process in accordance with the present invention. Initially, an RFID tag or chip will be attached to, or incorporated along with, the material lifting product. A particular unique alphanumeric identification designation will be assigned to each chip and, accordingly, to each lifting product. During or after the manufacturing process, the RFID tag will include information on the type of product, for example, a chain sling, the date that the product was put into, the last inspection date, and the status of the product at the last inspection, as shown at box 60. The foregoing will be accomplished prior to putting the material lifting device in service.

As seen in FIG. 7 under the description "Mode 2", shown as the Inspection Mode in box 62, the date of the last inspection will be read by an RFID reader as shown at box 64. For example, the end user of the material lifting device may periodically determine the date of the last inspection.

The inspection process is shown under the column designated "Mode 3", described as Inspection Mode, PDA Version, as shown in box 66. An RFID reader/writer in the form of an RFID tag information reading mechanism or transceiver operates in conjunction with a portable computer, such as personal digital assistant (PDA) or similar device. Each of the computer devices would include a central processing unit, an input interface such as keyboard, a display or monitor, and communication means to communicate with the RFID tag. As seen at box 68 of FIG. 7, the inspector or user will initially be provided with a choice in the form of a template to select from various lifting products, such as a block, hoist ring, clamp, or sling, as shown at box 70. The RFID reader will then be brought into position within an acceptable distance so that the radio signal transmitted to the material lifting device and RFID tag is discernable. As shown at box 72, the reader will read the serial number of the particular material lifting device.

Thereafter, as shown at diamond 74, the serial number will be searched against a database held in the memory of the personal digital assistant portable computer device to see if there is a match. If the serial number does not match any in the database, as shown at box 76, the inspector or user will be provided an option to select a template as shown at box 78. A blank template without pre-populated information will then be presented on the monitor or display of the personal digital assistant, as shown at block 80.

The inspector or user will then be permitted to input inspection data on to the PDA portable computer device, as shown at box 82.

Returning to a consideration of diamond 74, if a match of the serial number on the RFID tag is found with the database stored in the PDA portable computer device as shown at box 86, an inspection screen or template will be presented to the user on the monitor or display which includes all of the data or information which has been compiled to date as shown at box 88.

Figure 8:
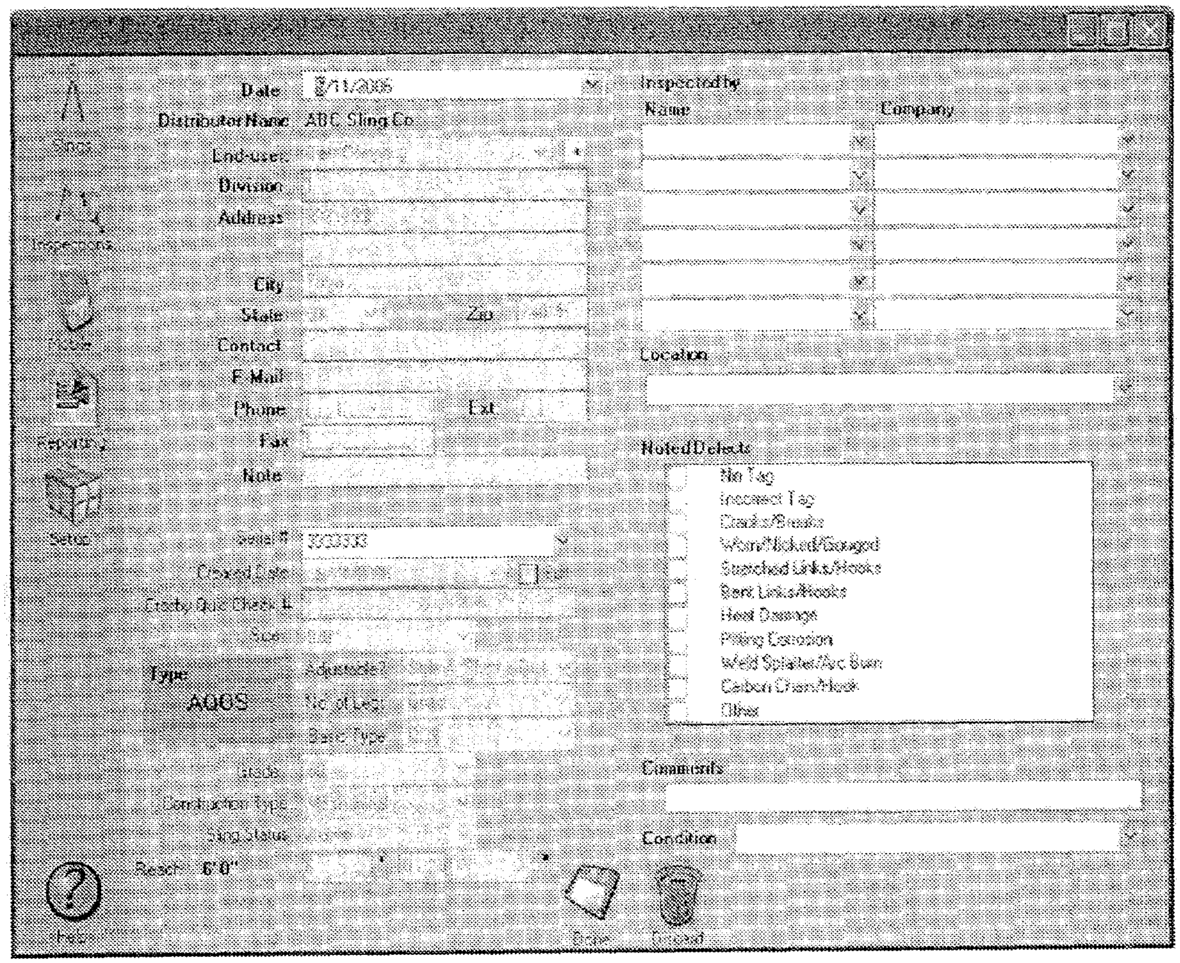
FIG. 8 shows an example of a screen display utilized in conjunction with the present invention.

By way of example but not by way of limitation, FIG. 8 shows an example of a screen display that would be presented to an inspector on a portable computer device. As can be seen, the name of the distributor of the lifting product is displayed along with the end user company. The serial number of the particular lifting product is shown along with particulars about the product such as the grade, the construction type and other pertinent information. The name and company of the inspector is also noted. Additionally, any noted defects would be noted by the inspector on the inspection template. Finally, the PDA may be attached, linked or put in communication with a secondary computing device such as a personal computer (not shown). The information stored on the portable computer device can be downloaded and stored on the personal computer database memory. Accordingly, the inspection information obtained at the inspection site may be stored on the computer system or computer network of the end user, the distributor, or even the manufacturer. Additionally, the database of the personal computer may have various inspection forms, training information, product warning information, ordering information for parts and supplies, and assembly information and industry specification, all of which are shown at box 96. Reports may be generated and displayed from the personal computer as shown at box 96.

Thereafter, the user or inspector will input data from the current inspection, such as the name and company of the inspector, the date of the inspection, any noted defects in the material lifting device, or other information as shown at box 90.

Once the inspection has been complete all of the changes entered onto the template of the inspection screen will be saved to the memory of the PDA portable computer devices as shown at box 92. The updated information will be sent and updated to the RFID tag on the material lifting device, as shown by dashed line box 94.

The entire inspection and record keeping may be performed at the work site at the location of the material lifting device.

Finally, under the column "Mode 4" of FIG. 7, a similar procedure may be utilized with a personal computer, such as a desk top computer.

Whereas, the present invention has been described in relation to the drawings attached hereto, it should be understood that other and further modifications, apart from those shown or suggested herein, may be made within the spirit and scope of this invention.

What is claimed is:

1. A method of identifying, inspecting and training regarding a material lifting device, which method comprises:

attaching an RFID tag to a material lifting device;

installing identification and inspection data regarding said material lifting device on said RFID tag, wherein said identification and inspection data includes a unique alphanumeric identification of said RFID tag, a material lifting device product type, a material lifting device manufacture date, a status indicator of said material lifting device, and references to information on application of said material lifting device including training information on use, product warning information, and applicable industry and government standards;

accessing said identification and inspection data on said RFID tag with a portable computer device having a central processing unit, a memory, a display and an RFID reader;

comparing said identification data on said RFID tag against a database, wherein said database includes information on application of said material lifting device including training information on use, product warning information, and applicable inspection methods, visual acceptance criteria, industry and government standards;

accessing forms of templates on said portable computer device, wherein said templates include an identification template, an inspection template with criteria on applicable inspection methods, visual acceptance criteria, industry and government standards, and a template on training information on use of said material lifting device;

periodically inspecting said material lifting device to obtain inspection data about said material lifting device;

updating said identification and inspection data on said portable computer device by entering on one of said templates; and updating said identification and inspection data on said RFID tag.

2. A method of identifying, inspecting and training as set forth in claim 1 including the additional step of storing data regarding personnel training on said computer device.

3. A method of identifying, inspecting and training as set forth in claim 1 wherein said material lifting device is a block.

4. A method of identifying, inspecting and training as set forth in claim 1 wherein said material lifting device is a wire rope sling.

5. A method of identifying, inspecting and training as set forth in claim 1 wherein said material lifting device is a plate clamp.

6. A system for identifying, inspection and training regarding a material lifting device, which system comprises:

an RFID tag attached to a material lifting device wherein said RFID tag includes identification and inspection data stored thereon prior to putting said material lifting device into service, said data regarding said material lifting device including a unique alphanumeric identification of said RFID tag, a material lifting device product type, a material lifting device manufacture date, and a status indicator of said material lifting device;

a portable computer device having a central processing unit, a display, and an RFID reader wherein said device includes a templates with identification and inspection data including an identification template, an inspection template with criteria on applicable inspection methods, visual acceptance criteria, industry and government standards, and a template regarding training on use of said material lifting device;

means to compare said identification data and said inspection data on said RFID tag against a database, wherein said database includes information on application of said material lifting device including training information on use, product warning information, and applicable inspection methods, visual acceptance criteria, industry and government standards;

means to update said identification and inspection data on said portable computer device by entering on one of said templates; and means to update said identification and inspection data on said RFID tag.

* * * * *